# 2,889,297
Patented June 2, 1959

2,889,297

POLYVINYL ACETATE ADHESIVE COMPOSITIONS CONTAINING A POLYETHYLENE GLYCOL MONOETHER OF A MONOHYDRIC PHENOL

John D. Brandner, Arden, Del., and Robert H. Hunter, Mendenhall, Pa., assignors to Atlas Powder Company, Wilmington, Del., a corporation of Delaware No Drawing. Application June 29, 1953
Serial No. 364,955

4 Claims. (Cl. 260—29.6)

This invention relates to adhesive compositions, and more particularly to plasticized polyvinyl acetate adhesives.

It is an object of the invention to provide novel plasticized polyvinyl acetate compositions.

Another object is to provide adhesive polyvinyl acetate compositions of improved adhesive qualities.

A further object of the invention is to provide polyvinyl acetate adhesives which exhibit permanent tackiness.

A still further object is to provide plasticized polyvinyl acetate emulsion compositions which become tacky with great speed when deposited as a thin film.

The above and other objects will become apparent in the course of the following description of the invention.

That polymerized vinyl esters are excellent adhesive materials has long been recognized. Polyvinyl acetate, in particular, has been widely used in formulating adhesives. Such adhesives have found application in wood joining, in paper laminating, in sealing of cartons and packages, in book and tablet binding, and the like. The polyvinyl acetate employed in adhesives may be in the form of a solution in volatile solvents, in hot melt, or in aqueous emulsion. In some applications polyvinyl acetate may be the sole permanent ingredient of the adhesive but more often it is compounded with other adhesive materials, thickening agents, and particularly with plasticizers.

Plasticizers in polyvinyl acetate adhesives may be employed for the sole purpose of rendering the adhesive film flexible, as in bookbinding adhesives, in paper-foil laminations and the like. But even where flexibility of the bonded product is not sought, it is frequently advantageous to incorporate plasticizers with the polyvinyl acetate for specific purposes, such as modifying the tackiness of the adhesive.

In accordance with the present invention it has been found that polyvinyl acetate adhesives of improved qualities are obtained by employing as plasticizers therein polyglycol ethers of phenols. More specifically, the plasticizers employed in the adhesive compositions of the invention are polyethylene glycol ethers of phenol and of alkyl phenols containing not more than 4 alkyl carbon atoms. The alkyl carbon atoms may be present in a single alkyl radical, which may be straight chain or branched, or may be distributed among a plurality of alkyl radicals. The polyglycol radical of the ethers employed as plasticizers in the adhesives of the invention contain at least 3 oxyethylene groups and, when the phenyl radical is unsubstituted, may contain as many as 12 oxyethylene groups. When the phenyl radical contains alkyl substituents the maximum number of oxyethylene groups should be reduced by 1.5 units for each alkyl carbon atom. Polyglycol ethers contemplated thus include from triethylene to dodecaethylene glycol ethers of phenol, from triethylene to decaethylene glycol ethers of the several cresols, from triethylene to nonaethylene glycol ethers of the several xylenols and ethyl phenols, from triethylene to heptaethylene glycol ethers of the several propyl phenols, isopropyl phenols, trimethyl phenols, and other substituted phenols containing 3 alkyl carbon atoms, and from triethylene to hexaethylene glycol ethers of the several alkyl substituted phenols containing 4 alkyl carbon atoms. The plasticizers so described may be more succinctly defined as polyethylene glycol ethers of phenols, which phenols contain no substituents other than alkyl radicals and no more than 4 alkyl carbon atoms, the number of oxyethylene groups in said ethers being at least 3 and no greater than $n$ in the expression $n=12-1.5C$ wherein $C$ is the number of said alkyl carbon atoms.

Of the several ethers so defined the preferred plasticizers are tetraethylene to hexaethylene glycol ethers of phenol and of cresol.

The said phenolic ethers of polyglycols may be prepared by methods well-known in the art. Commercially it is expedient to prepare them by the direct addition of ethylene oxide to the phenol or substituted phenol in proportion to yield the desired number of oxyethylene groups per aryl radical. It is recognized that ethers so prepared are mixtures of ethers containing various numbers of oxyethylene groups per mol, which, in the statistical average, is the number of mols of ethylene oxide added per mol of phenol. Such mixtures for purposes of this invention are equivalent to the named individual polyglycol ethers of phenols.

The said polyglycol ethers are valuable plasticizers for polyvinyl acetate adhesives in any of their useful forms. Thus they may be incorporated in solutions of polyvinyl acetate in volatile solvents. Alternatively, they may be absorbed in powdered polyvinyl acetate to yield a product which may be placed in dry form between two surfaces to be bonded and the assembly subjected to heat and pressure to effect adhesion. Also, polyvinyl acetate plasticized with the ethers above described may be employed by the hot melt technique.

The plasticizers of the invention are particularly useful with polyvinyl acetate emulsion adhesives. Such emulsions are those obtained by the emulsion polymerization of monomeric vinyl acetate, the characteristics of the adhesive varying somewhat with the degree of polymerization. Among suitable polyvinyl acetate emulsions are those commercially available under the designations Gelva S–55, Elvacet 81–900, Polyco 117–SS and Polyco 505.

The plasticizers may be added directly to the emulsions, preferably while the latter are vigorously agitated. The viscosity of the plasticized emulsion may be controlled by the addition of water or by the incorporation of colloidal thickeners as desired.

The proportion of plasticizer to polyvinyl acetate in adhesive compositions of the invention may vary widely depending upon the use to which the adhesive is to be put and the properties sought. As little as 5% to 10% of plasticizer based on the polyvinyl acetate produces a marked flexibilizing effect and these small amounts may be employed advantageously in hot melt compositions for bookbinding and tabbing adhesives. When employed in larger proportions, preferably from 20% to 150% by weight based on the polyvinyl acetate content, the plasticizers of the invention are particularly useful in emulsion adhesives where they impart very desirable properties in tackiness of film. Films of polyvinyl acetate emulsion so plasticized develop a decided tack very promptly, making possible a short cycle in assembly of surfaces to be bonded. Moreover, the films remain flexible and tacky indefinitely. They are thus of value in the production of adhesive bandages and tapes.

It is to be understood that the preferred upper proportion of 150% plasticizer mentioned above does not represent the upper limit of useful plasticizer content and that for special purposes adhesive compositions of polyvinyl acetate containing 200%, or even more, of the hereinbefore described phenolic polyglycol ethers based on the polyvinyl acetate are useful and are considered within the purview of the invention.

The following examples illustrate specific embodiments of the invention.

Example 1

Vigorous agitation was set up in 100 parts by weight of a polyvinyl acetate latex containing 55% solids and 11 parts of mono phenyl-triethylene glycol ether was added gradually. The resulting composition is an excellent adhesive exhibiting permanent tack when spread in a 1.5 mil film on glass. When the water has evaporated from the emulsion the emulsion particles are coalesced into a transparent continuous film.

Example 2

Monophenyl ether of dodecaethylene glycol is substituted for the triethylene glycol ether of Example 1. The resulting composition like that of Example 1 yields permanently tacky films. The dehydrated film was slightly hazy.

Example 3

Vigorous agitation is set up in 100 parts by weight of a polyvinyl acetate latex containing 55% solids and a solution of 55 parts of monophenyl hexaethylene glycol ether in 45 parts of water was added gradually. The resulting composition was an excellent adhesive, and permanently tacky when spread in thin film. The film was transparent when dehydrated.

Example 4

Monophenyl tetraethylene glycol ether is substituted for the monophenyl hexaethylene glycol ether of Example 3. Like the composition of Example 3, the product yields clear, transparent, permanently tacky films.

Example 5

The condensation product of 6 mols of ethylene oxide with one molar proportion of mixed (ortho, meta and para) cresols was substituted for the monophenyl ether of Example 3 above. As before, a permanently tacky adhesive composition was produced.

Example 6

Vigorous agitation was set up in 100 parts by weight of a polyvinyl acetate latex containing 55% solids and a solution of 83 parts of monocresyl tetraethylene glycol ether in 124 parts of water was added gradually. A very flexible, permanently tacky, adhesive was obtained which was transparent on dehydration.

Example 7

The condensaion product of 4 mols of ethylene oxide with one mol of para tertiary butyl phenol was substituted for the monophenyl triethylene glycol ether of Example 1. The resulting product was an excellent adhesive, exhibiting permanent tack and transparency on evaporation of water from the emulsion.

In the foregoing examples the films were tested for tack with the tack testing device of Bonner and Brewster (U.S. Patent 2,406,989) employing aluminum foil as the test surface and applying it to the film under test for 10 seconds under a weight of 450 grams. The contact area was one square inch. The films were considered permanently tacky if the tester did not fall over in twenty seconds when the film under test had aged for 7 days.

Example 8

An excellent plasticized bookbinding adhesive may be prepared by incorporating 5% of monophenyl ether of tetraethylene glycol in powdered polyvinyl acetate and melting the mixture for application to the edges of the pages to be bound.

In the foregoing examples the adhesive compositions comprised only polyvinyl acetate and plasticizer as the active ingredients. In the formulation of polyvinyl acetate adhesives other ingredients are frequently employed and polyvinyl acetate plasticized with the ethers herein disclosed may be so compounded. Thus the compositions of any of Examples 1 to 7 may be admixed with aqueous solutions of phenol-formaldehyde condensation products to yield adhesives which are more water resistant than the unmodified polyvinyl acetate adhesives. The compositions may contain as much as 50%, or even more, of the modifying resin. Moreover, thickening agents such as gum arabic, sodium carboxymethyl cellulose, or the like may be incorporated in the emulsions to render them of higher viscosity when a pasty consistency is desired. Such modifications of the basic compositions of the invention are within the skill of the art and compositions so modified are considered to be within the purview of the invention.

What is claimed is:

1. An adhesive composition which yields permanently tacky films and comprises polyvinyl acetate and from 20% to 200% by weight, based on the polyvinyl acetate, a polyethylene glycol mono-ether of a monohydric phenol, the said phenol containing no substituents other than alkyl radicals and no more than 4 alkyl carbon atoms, and said polyethylene glycol containing at least 3 oxyethylene groups but no more of said groups than $n$ in the expression $n=12-1.5C$ wherein C is the number of said alkyl carbon atoms.

2. An adhesive composition which yields permanently tacky films and comprises an aqueous emulsion of polyvinyl acetate and from 20% to 200% by weight, based on the polyvinyl acetate, a polyethylene glycol mono-ether as defined in claim 1.

3. An adhesive composition comprising an aqueous emulsion of polyvinyl acetate and, per part of polyvinyl acetate, from 0.2 to 1.5 parts by weight of a polyglycol mono-ether of phenol containing from 4 to 6 oxyethylene groups per mol.

4. An adhesive composition comprising an aqueous emulsion of polyvinyl acetate and, per part of polyvinyl acetate, from 0.2 to 1.5 parts by weight of a polyglycol mono-ether of cresol containing from 4 to 6 oxyethylene groups per mol.

References Cited in the file of this patent

UNITED STATES PATENTS

| | | |
|---|---|---|
| 1,952,243 | Frick | Mar. 27, 1934 |
| 1,970,578 | Schroeller et al. | Aug. 21, 1934 |
| 2,213,477 | Steindorff et al. | Sept. 3, 1940 |
| 2,263,444 | Moyle | Nov. 18, 1941 |
| 2,386,764 | Zwicker | Oct. 16, 1945 |
| 2,473,929 | Wilson | June 21, 1949 |
| 2,508,341 | Wilson | May 16, 1950 |
| 2,536,018 | Schoenholz et al. | Jan. 2, 1951 |
| 2,595,952 | Kunze et al. | May 6, 1952 |

FOREIGN PATENTS

| | | |
|---|---|---|
| 327,158 | Great Britain | Mar. 28, 1930 |